May 27, 1930.  E. FELDIN  1,760,304
LUMBER LOADING ROLL
Filed Oct. 22, 1928
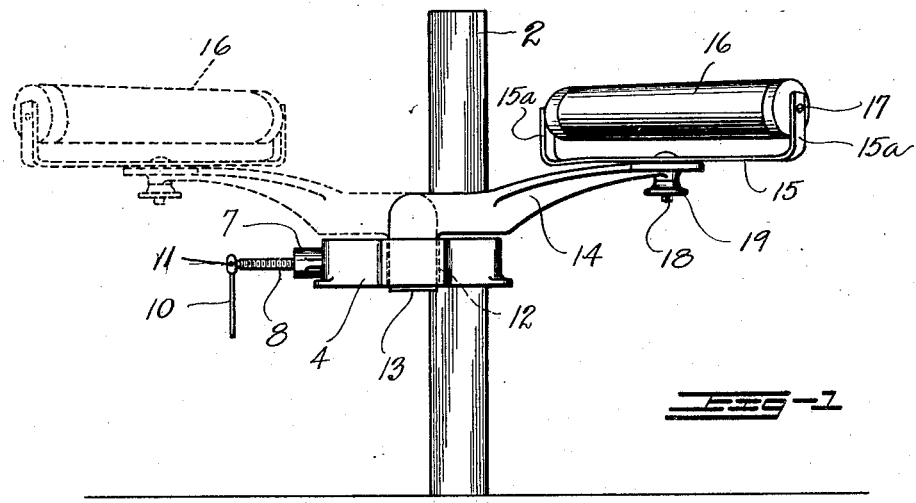
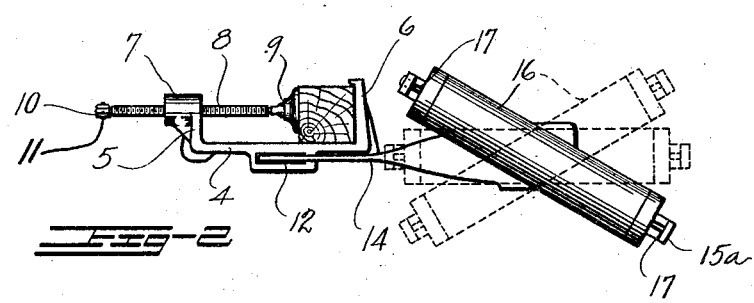
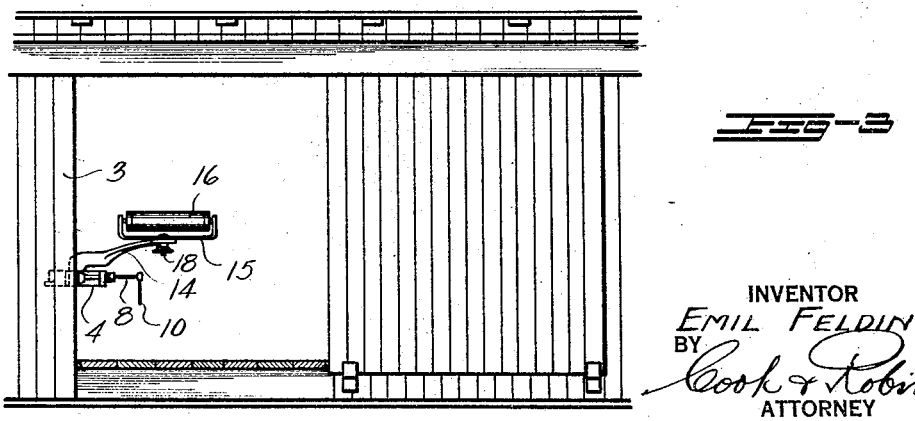
INVENTOR
EMIL FELDIN
BY
Cook & Robinson
ATTORNEY Patented May 27, 1930

1,760,304

UNITED STATES PATENT OFFICE

EMIL FELDIN, OF EVERETT, WASHINGTON

LUMBER-LOADING ROLL

Application filed October 22, 1928. Serial No. 314,100.

This invention relates to improvements in means for handling lumber, beams, tubes, etc., and has particular reference to devices designed for loading lumber into or from cars. The device consists of a roll with means for mounting it on a car stake, or in a car door or like opening in the wall, whereby the transfer of lumber or similar products into or from the car may be greatly facilitated.

The principal object of the present invention is to provide an efficient and relatively inexpensive mechanism by which the loading of materials of the above stated character may be greatly expedited, which may be easily and quickly attached or detached and which is easily adjustable to various positions required for meeting different conditions of operation.

More specifically, the invention resides in the provision of a lumber loading device consisting of a mounting in the nature of a clamp, that may be detachably fixed to a post, beam, stake or other supporting element and which is provided with a socket for receiving therein the mounting end of a laterally extending bracket which, at its outer end, supports a horizontally disposed roller over which the articles being loaded may be transferred; the clamp being adjustable to various positions on its support, the bracket being adjustable to different positions with respect to the clamp and the roller being pivotally adjustable to various horizontal positions relative to the bracket to thereby meet all conditions required for satisfactory use of a device of this character.

Other objects of the invention reside in the various details of construction and in the combination of parts, as is hereinafter described.

In accomplishing these objects, I have provided the improved details of construction, the preferred forms of which are illustrated in the accompanying drawings, wherein—

Figure 1 is a side elevation of a lumber loading roll constructed and mounted in accordance with the present invention.

Figure 2 is a plan view of the same.

Figure 3 is a view illustrating the manner of mounting the device in a car door.

Referring more in detail to the drawings—

In its preferred form of construction, the device comprises a mounting member in the nature of a clamp adapted to be detachably secured to a supporting member, which may be a post, beam or car stake as indicated at 2 in Figures 1 and 2, or it may be attached to the post or frame at the side of a car door, as indicated at 3 in Figure 3, or it may be attached to any other suitable supporting member convenient for that purpose. The clamp comprises a flat bar 4 with laterally turned end portions 5 and 6, as shown in Figure 2; the end portion 5 being equipped with a bearing 7 through which a clamp screw 8 is threaded to extend to the end portion 6 of the clamp. A clamping pad 9 is pivotally attached to the inner end of the screw to operate in opposed relation to the clamp end 6 as a means of securing the device to the supporting post 2 and, at the outer end of the screw, is a suitable handle 10 whereby the screw may be turned to adjust it inwardly or outwardly. As here shown, the handle is in the nature of a lever that is hingedly attached at one end by a pivot pin 11 to the end of the screw, and this may be used as a crank whereby the screw is rotated.

Formed in the bar 4, is a flat vertical socket 12 open at both ends and within which the downturned shank 13 of a horizontally extending bracket 14 is removably fitted. The shank is flattened so as to fit the socket and the bracket is arranged so as to extend horizontally in the same direction as the bar 4, and the position of the bracket with respect to the bar may be reversed by reversing the mounting end 13 in the socket. The two positions of the bracket, with respect to the clamp, are shown respectively in full and in dotted lines in Figure 1.

The bracket 14 extends upwardly somewhat from the support and is formed with a horizontally flattened top surface, and on this, is a pivotally supported yoke 15 within which a horizontally disposed roller 16 is rotatably mounted; the roller being equipped at its opposite ends with trunnions 17 pivotally contained in the upwardly directed end portions 15ª of the yoke 15. The means for pivotally mounting the yoke on the bracket consists of a bolt 18 that extends downwardly through the yoke base and through the end of the bracket and, at its lower end, is equipped with a nut 19 adapted to be tightened to draw the parts together to hold the yoke at any of the various positions to which it may be adjusted.

In using the device, the clamp is first attached to the support member and then the end 13 of the bracket is inserted in the clamp socket in such manner that the bracket will extend in the direction desired. Then, the roller yoke is adjusted on the bracket to the desired angular position with respect to the bracket, in accordance with the direction in which it is desired to pass the material over the roller. The material to be transferred is then passed over the roller and this carries the weight of the material and thereby greatly facilitates its handling.

By reference to Figure 1 of the drawing, it will be apparent how the position of the bracket may be reversed on the clamp for loading materials in different directions, and by reference to Figure 2, the different positions to which the roller may be adjusted with respect to the bracket is apparent. These adjustments permit the loading of lumber in opposite directions and thereby avoid many readjustments that otherwise would be required.

Having thus described my invention, what I claim as new therein and desire to secure by Letters-Patent, is:

1. A device of the character described comprising a clamp bar provided with a socket, and clamp mechanism associated with the bar for detachably securing it at various positions of adjustment on a supporting member, a bracket having a mounting shank removably applicable to the socket as a means of supporting the bracket in a horizontally extended position and said shank being reversible in the socket to change the relation of the bracket with respect to the bar, a yoke pivotally mounted at the outer end of the bracket, and a horizontally disposed roller supported at its ends in said yoke and releasable means for securing the yoke to the bracket to retain the yoke at various positions of adjustment.

2. A device of the character described comprising a clamp bar with a vertical socket therein; said bar having laterally turned ends, a clamp screw threaded through one of said ends, a clamp pad at the inner end of the screw adjustable thereby from and toward the other end of the bar, a lever at the outer end of the screw for rotating it, a horizontally extended bracket having a mounting shank at one end reversibly applicable to said socket to support the bracket respectively in reverse positions, a yoke pivotally mounted by the bracket, a roller supported horizontally by said yoke and a locking means for holding the yoke at various positions of adjustment with respect to the bracket.

Signed at Seattle, Washington, this 12th day of October, A. D. 1928.

EMIL FELDIN.